United States Patent
Ikeuchi et al.

(10) Patent No.: US 9,812,702 B2
(45) Date of Patent: Nov. 7, 2017

(54) LITHIUM ION SECONDARY BATTERY HAVING POSITIVE ELECTRODE THAT COMPRISES THERMAL RUN-AWAY SUPPRESSING LAYER ON POSITIVE ELECTRODE ACTIVE MATERIAL LAYER

(71) Applicants: KABUSHIKI KAISHA TOYOTA JIDOSHOKKI, Kariya-shi, Aichi (JP); NATIONAL INSTITUTE OF ADVANCED INDUSTRIAL SCIENCE AND TECHNOLOGY, Tokyo (JP)

(72) Inventors: Yuta Ikeuchi, Ikeda (JP); Toshikatsu Kojima, Ikeda (JP); Tetsuo Sakai, Ikeda (JP); Tatsuya Eguchi, Kariya (JP); Hitoshi Aikiyo, Kariya (JP); Akira Kojima, Kariya (JP)

(73) Assignees: KABUSHIKI KAISHA TOYOTA JIDOSHOKKI, Kariya-shi, Aichi (JP); NATIONAL INSTITUTE OF ADVANCED INDUSTRIAL SCIENCE AND TECHNOLOGY, Chiyoda-ku, Tokyo (JP)

( * ) Notice: Subject to any disclaimer, the term of this patent is extended or adjusted under 35 U.S.C. 154(b) by 0 days.

(21) Appl. No.: 14/912,971

(22) PCT Filed: Jul. 17, 2014

(86) PCT No.: PCT/JP2014/003787
§ 371 (c)(1),
(2) Date: Feb. 19, 2016

(87) PCT Pub. No.: WO2015/025466
PCT Pub. Date: Feb. 26, 2015

(65) Prior Publication Data
US 2016/0204421 A1 Jul. 14, 2016

(30) Foreign Application Priority Data

Aug. 22, 2013 (JP) .................. 2013-172195

(51) Int. Cl.
*H01M 4/00* (2006.01)
*H01M 4/131* (2010.01)
(Continued)

(52) U.S. Cl.
CPC ........... *H01M 4/131* (2013.01); *H01M 4/366* (2013.01); *H01M 4/386* (2013.01); *H01M 4/505* (2013.01);
(Continued)

(58) Field of Classification Search
CPC ........ H01M 4/131; H01M 4/386; H01M 4/62; H01M 4/505; H01M 4/525; H01M 4/366;
(Continued)

(56) References Cited

U.S. PATENT DOCUMENTS

2003/0054254 A1   3/2003  Kubo et al.
2010/0273056 A1*  10/2010 Kanda ................ H01M 4/0421
                                                          429/223

(Continued)

FOREIGN PATENT DOCUMENTS

JP   2003-157854 A   5/2003
JP   2008-300239 A   12/2008
(Continued)

OTHER PUBLICATIONS

International Search Report for PCT/JP2014/003787 dated Oct. 14, 2014 [PCT/ISA/210].
(Continued)

*Primary Examiner* — Jane Rhee
(74) *Attorney, Agent, or Firm* — Sughrue Mion, PLLC

(57) ABSTRACT

To provide a lithium ion secondary battery capable of suppressing thermal run-away when internal short circuiting
(Continued)

occurs. The lithium ion secondary battery includes: a positive electrode including a current collector, a positive electrode active material layer that is formed on the current collector and that contains a lithium-containing complex oxide having a layered rock salt structure and being represented by general formula: $Li_aNi_bCo_cMn_dD_eO_f$ ($0.2 \leq a \leq 1$; $b+c+d+e=1$; $0 \leq e < 1$; D is at least one element selected from Li, Fe, Cr, Cu, Zn, Ca, Mg, S, Si, Na, K, and Al; $1.7 \leq f \leq 2.1$), and a thermal run-away suppressing layer formed on the positive electrode active material layer and containing a lithium transition metal silicate; and a negative electrode including a negative electrode active material. A ratio of the mass of the lithium-containing complex oxide with respect to the mass of the lithium transition metal silicate in the positive electrode is not lower than 1.5.

5 Claims, 1 Drawing Sheet

(51) Int. Cl.
*H01M 4/38* (2006.01)
*H01M 4/62* (2006.01)
*H01M 10/0525* (2010.01)
*H01M 4/505* (2010.01)
*H01M 4/525* (2010.01)
*H01M 4/36* (2006.01)
*H01M 10/052* (2010.01)
*H01M 4/02* (2006.01)

(52) U.S. Cl.
CPC .............. *H01M 4/525* (2013.01); *H01M 4/62* (2013.01); *H01M 10/052* (2013.01); *H01M 10/0525* (2013.01); *H01M 2004/028* (2013.01)

(58) Field of Classification Search
CPC ........... H01M 10/0525; H01M 10/052; H01M 2004/028
See application file for complete search history.

(56) References Cited

U.S. PATENT DOCUMENTS

| | | | |
|---|---|---|---|
| 2011/0065004 | A1 | 3/2011 | Murakami et al. |
| 2011/0168550 | A1 | 7/2011 | Wang et al. |
| 2012/0263998 | A1* | 10/2012 | Thackeray ............ H01M 4/131 429/156 |

FOREIGN PATENT DOCUMENTS

| | | |
|---|---|---|
| JP | 2011-082151 A | 4/2011 |
| JP | 2011-238490 A | 11/2011 |
| JP | 2011-243349 A | 12/2011 |
| JP | 2012-018832 A | 1/2012 |
| JP | 2013-519187 A | 5/2013 |

OTHER PUBLICATIONS

Written Opinion for PCT/JP2014/003787 dated Oct. 14, 2014 [PCT/ISA/237].

* cited by examiner

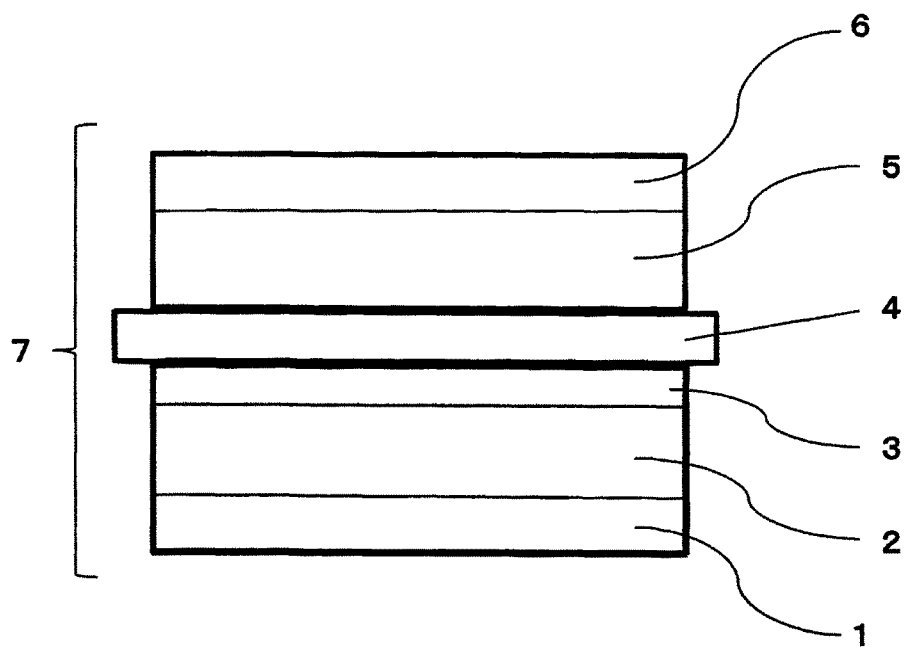

LITHIUM ION SECONDARY BATTERY HAVING POSITIVE ELECTRODE THAT COMPRISES THERMAL RUN-AWAY SUPPRESSING LAYER ON POSITIVE ELECTRODE ACTIVE MATERIAL LAYER

CROSS REFERENCE TO RELATED APPLICATIONS

This application is a National Stage of International Application No. PCT/JP2014/003787 filed Jul. 17, 2014, claiming priority based on Japanese Patent Application No. 2013-172195 filed Aug. 22, 2013, the contents of all of which are incorporated herein by reference in their entirety.

TECHNICAL FIELD

The present invention relates to a lithium ion secondary battery that has a positive electrode including a thermal run-away suppressing layer on a positive electrode active material layer.

BACKGROUND ART

The number of products using secondary batteries keeps increasing, and secondary batteries are generally recognized as being essential for mobile devices such as mobile phones and notebook PCs. Among the secondary batteries, lithium ion secondary batteries are used widely since being small in size and having a large capacity, and are also employed in airplanes and automobiles. In recent years, research is actively conducted on lithium ion secondary batteries for the purpose of providing better lithium ion secondary batteries.

Regarding the safety aspect of lithium ion secondary batteries, ensuring safety when internal short circuiting occurs in a lithium ion secondary battery is important. A known method for confirming safety when internal short circuiting occurs in a battery is a nail penetration test for observing how a battery behaves when the battery is penetrated with a nail. In fact, Patent Literature 1 describes a lithium ion secondary battery that did not ignite when the nail penetration test was performed. The lithium ion secondary battery disclosed in Patent Literature 1 is obtained by segmenting an electrode into sheets having a specific shape.

In addition, Patent Literature 2 describes a lithium ion secondary battery that has: a positive electrode including a first positive electrode active material layer that contains $LiNiO_2$ and a second positive electrode active material layer that contains $Li_2FeSiO_4$ or $LiFePO_4$; and a negative electrode containing $Cu_6Sn_6$ as a negative electrode active material, wherein the amount of lithium in the second positive electrode active material layer is equal to or larger than an amount corresponding to an irreversible capacity of the negative electrode active material. However, the nail penetration test is not mentioned therein.

CITATION LIST

Patent Literature

Patent Literature 1: JP2003157854 (A)
Patent Literature 2: JP2011238490 (A)

SUMMARY OF INVENTION

Technical Problem

The technology disclosed in Patent Literature 1 defines, with a certain relational formula, the area size and shape of the sheets of the segmented electrode, and the distance between a positive electrode current collector and a negative electrode current collector. Thus, multiple restrictions were imposed for the components of the lithium ion secondary battery. In addition, since lithium ion secondary batteries are used in airplanes and automobiles, the level of safety required for lithium ion secondary batteries has become higher.

The present invention was accomplished in view of the above described situation, and an objective of the present invention is to provide a lithium ion secondary battery capable of suppressing temporal and spatial concentration of heat generated due to a chemical reaction between a positive electrode and a nonaqueous electrolyte when internal short circuiting occurs.

Solution to Problem

The present inventors have conducted thorough investigation into components of a lithium ion secondary battery with much trial and error. The present inventors completed the present invention after discovering that a lithium ion secondary battery, in which a thermal run-away suppressing layer containing a specific compound is disposed on a positive electrode active material layer within a specific range, is superior in stability even when internal short circuiting occurs.

A lithium ion secondary battery of the present invention includes: a positive electrode including a current collector, a positive electrode active material layer that is formed on the current collector and that contains a lithium-containing complex oxide having a layered rock salt structure and being represented by a general formula: $Li_aNi_bCo_cMn_dD_eO_f$ ($0.2 \leq a \leq 1$; $b+c+d+e=1$; $0 \leq e < 1$; D is at least one element selected from Li, Fe, Cr, Cu, Zn, Ca, Mg, S, Si, Na, K, and Al; $1.7 \leq f \leq 2.1$), and a thermal run-away suppressing layer that is formed on the positive electrode active material layer and that contains a lithium transition metal silicate; and a negative electrode including a negative electrode active material, wherein a ratio of the mass of the lithium-containing complex oxide with respect to the mass of the lithium transition metal silicate in the positive electrode is not lower than 1.5.

Advantageous Effects of Invention

The lithium ion secondary battery of the present invention is superior in stability even when internal short circuiting occurs.

BRIEF DESCRIPTION OF DRAWINGS

FIG. 1 is a schematic diagram showing one mode of a lithium ion secondary battery of the present invention.

DESCRIPTION OF EMBODIMENTS

The following describes embodiments of the present invention. Unless mentioned otherwise in particular, a numerical value range of "a to b" described in the present application includes, in the range thereof, a lower limit "a" and an upper limit "b." A numerical value range can be formed by arbitrarily combining such upper limit values, lower limit values, and numerical values described in Examples. In addition, numerical values arbitrarily selected within the numerical value range can be used as upper limit and lower limit numerical values.

A lithium ion secondary battery of the present invention includes: a positive electrode including a current collector, a positive electrode active material layer that is formed on the current collector and that contains a lithium-containing complex oxide having a layered rock salt structure and being represented by a general formula: $Li_aNi_bCo_cMn_dD_eO_f$ ($0.2 \le a \le 1$; $b+c+d+e=1$; $0 \le e<1$; D is at least one element selected from Li, Fe, Cr, Cu, Zn, Ca, Mg, S, Si, Na, K, and Al; $1.7 \le f \le 2.1$), and a thermal run-away suppressing layer that is formed on the positive electrode active material layer and that contains a lithium transition metal silicate; and a negative electrode including a negative electrode active material, wherein a ratio of the mass of the lithium-containing complex oxide with respect to the mass of the lithium transition metal silicate in the positive electrode is not lower than 1.5.

The current collector refers to a fine electron conductor that is chemically inert for continuously sending a flow of current to the electrode during discharging or charging of the lithium ion secondary battery. Examples of the material of the current collector include at least one selected from silver, copper, gold, aluminum, magnesium, tungsten, cobalt, zinc, nickel, iron, platinum, tin, indium, titanium, ruthenium, tantalum, chromium, or molybdenum, metal materials such as stainless steel, and carbon materials such as graphite. In particular, from aspects such as electrical conductivity, processability, stability, and price; the material of a positive electrode current collector is preferably aluminum, and the material of a negative electrode current collector is preferably copper. The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, its thickness is preferably within a range of 10 μm to 100 μm.

From a standpoint of high capacity, the lithium-containing complex oxide, which is a positive electrode active material, having a layered rock salt structure and being represented by a general formula of $Li_aNi_bCo_cMn_dD_eO_f$ ($0.2 \le a \le 1$; $b+c+d+e=1$; $0 \le e<1$; D is at least one element selected from Li, Fe, Cr, Cu, Zn, Ca, Mg, S, Si, Na, K, and Al; $1.7 \le f \le 2.1$) preferably satisfies the ranges of $0<b<1$, $0<c<1$, and $0<d<1$, more preferably satisfies the ranges of $0<b<70/100$, $0<c<50/100$, and $10/100<d<1$, further preferably satisfies the ranges of $1/3 \le b \le 50/100$, $20/100 \le c \le 1/3$, and $1/3<d<1$, and particularly preferably satisfies $b=1/3$, $c=1/3$, and $d=1/3$ or $b=50/100$, $c=20/100$, and $d=30/100$. "a," "e," and "f" are not particularly limited as long as they have a numerical value within the above described range. One example thereof is $a=1$, $e=0$, and $f=2$.

The positive electrode active material layer is a layer formed on the current collector and contains the positive electrode active material. The positive electrode active material layer includes a binding agent and/or a conductive additive if necessary.

The binding agent serves a role of fastening the active material on the surface of the current collector. As the binding agent, a binding agent known in the art may be used, and examples thereof include fluorine-containing resins such as polyvinylidene fluoride, polytetrafluoroethylene, and fluororubbers, thermoplastic resins such as polypropylene and polyethylene, imide based resins such as polyimide and polyamide-imide, carboxymethyl cellulose, methyl cellulose, styrene butadiene rubbers, and alkoxysilyl group-containing resins. These binding agents may be added to the active material layer singly or as a combination of two or more. Although the usage amount of the binding agent is not particularly limited, a range of 1 to 50 parts by mass of the binding agent with respect to 100 parts by mass of the active material is preferable. The reason is that when too little of the binding agent is contained, moldability of the electrode and the active material layer deteriorates, whereas, when too much of the binding agent is contained, energy density of the electrode becomes low.

The conductive additive is added for increasing conductivity. Examples of the conductive additive include carbonaceous fine particles such as carbon black, graphite, acetylene black, Ketchen black (Registered Trademark), and vapor grown carbon fiber. These conductive additives may be added to the active material layer singly or as a combination of two or more. Although the usage amount of the conductive additive is not particularly limited, for example, 1 to 30 parts by mass of the conductive additive may be used with respect to 100 parts by mass of the active material.

When the whole positive electrode active material layer is defined as 100 parts by mass, the lithium-containing transition metal oxide in the positive electrode active material layer is preferably contained within a range of 50 to 99 parts by mass, more preferably within a range of 70 to 97 parts by mass, and particularly preferably within a range of 85 to 95 parts by mass.

In order to form the active material layer on the surface of the current collector, the active material may be applied directly on the surface of the current collector using a conventional method known in the art such as roll coating method, dip coating method, doctor blade method, spray coating method, and curtain coating method. Specifically, an active material layer forming composition including the active material and, if necessary, the binding agent and/or the conductive additive are/is prepared, and a paste-form liquid is obtained by adding a suitable solvent to this composition. The above described paste-form liquid may be prepared by using a solution obtained by dissolving the binding agent in a solvent in advance, or a suspension obtained by dispersing the binding agent in a solvent in advance. Examples of the solvent include N-methyl-2-pyrrolidone, methanol, ethanol, methyl isobutyl ketone, and water. The paste-form liquid is applied on the surface of the current collector, and then dried. The drying may be performed under an ordinary pressure condition, or may be performed under a reduced pressure condition achieved by using a vacuum dryer. The drying temperature may be set as appropriate, and is preferably a temperature equal to or higher than the boiling point of the solvent. The drying time may be appropriately set depending on the applied amount and the drying temperature. For the purpose of increasing the density of the active material layer, a compression step may be performed on the current collector that has been dried and on which the active material layer has been formed.

The lithium ion secondary battery of the present invention includes the thermal run-away suppressing layer that is formed on the positive electrode active material layer and that contains the lithium transition metal silicate.

Although the lithium transition metal silicate includes lithium, the charging/discharging potential with lithium ions is low when compared to the lithium-containing complex oxide having a layered rock salt structure and being represented by the general formula $Li_aNi_bCo_cMn_dD_eO_f$ ($0.2 \le a \le 1$; $b+c+d+e=1$; $0 \le e<1$; D is at least one element selected from Li, Fe, Cr, Cu, Zn, Ca, Mg, S, Si, Na, K, and Al; $1.7 \le f \le 2.1$). Thus, when the two coexist in the positive electrode of the lithium ion secondary battery, the lithium transition metal silicate practically does not function as an active material capable of occluding lithium ions, and exists as a high resistance compound. In such a case, when internal short circuiting occurs in the lithium ion secondary battery, since the lithium transition metal silicate functions as a high resistance compound, a significant flow of current between the positive electrode and the negative electrode is suppressed.

In addition, under a high temperature at which the positive electrode active material degrades, oxygen is thought to detach from the lithium-containing complex oxide having a layered rock salt structure and being represented by the general formula: $Li_aNi_bCo_cMn_dD_eO_f$ ($0.2 \leq a \leq 1$; $b+c+d+e=1$; $0 \leq e < 1$; D is at least one element selected from Li, Fe, Cr, Cu, Zn, Ca, Mg, S, Si, Na, K, and Al; $1.7 \leq f \leq 2.1$) contained in the positive electrode active material layer, and heat is thought to be generated due to a chain reaction occurring between the active oxygen and an electrolytic solution, etc. However, since the lithium ion secondary battery of the present invention has the thermal run-away suppressing layer formed on the positive electrode active material layer, contact between the lithium-containing complex oxide and an organic solvent forming the electrolytic solution is suppressed. As a result, since the chain reaction described above is suppressed, the lithium ion secondary battery of the present invention prevents a thermal run-away. Although oxygen atoms are also included in the molecule of the lithium transition metal silicate contained in the thermal run-away suppressing layer, these oxygen atoms normally do not become detached since the bond energy of an oxygen-silicon bond is high.

Because of the reason described above, the layer that is formed on the positive electrode active material layer and that contains the lithium transition metal silicate exerts a thermal run-away suppression effect.

However, since the lithium transition metal silicate simply becomes a high resistance compound during ordinary operation of the lithium ion secondary battery, having an excessive amount of the lithium transition metal silicate in the positive electrode is not preferable.

Thus, the present inventors have discovered, through experimentation, a proper mass ratio of the lithium transition metal silicate and the lithium-containing complex oxide having a layered rock salt structure and being represented by the general formula: $Li_aNi_bCo_cMn_dD_eO_f$ ($0.2 \leq a \leq 1$; $b+c+d+e=1$; $0 \leq e < 1$; D is at least one element selected from Li, Fe, Cr, Cu, Zn, Ca, Mg, S, Si, Na, K, and Al; $1.7 \leq f \leq 2.1$). More specifically, in the lithium ion secondary battery of the present invention, the ratio of the mass of the lithium-containing complex oxide with respect to the mass of the lithium transition metal silicate in the positive electrode is not lower than 1.5. Although ordinary operation of the lithium ion secondary battery is not affected as long as the above described ratio is not lower than 1.5; from a standpoint of discharge capacity of the lithium ion secondary battery, the above described ratio is preferably within a range of 2 to 10, more preferably within a range of 2.1 to 9, and particularly preferably within a range of 2.2 to 5.

As described above, Patent Literature 2 describes a lithium ion secondary battery that has: a positive electrode including a first positive electrode active material layer that contains $LiNiO_2$ and a second positive electrode active material layer that contains $Li_2FeSiO_4$ or $LiFePO_4$; and a negative electrode containing $Cu_6Sn_6$ as a negative electrode active material, wherein the amount of lithium in the second positive electrode active material layer is equal to or larger than an amount corresponding to an irreversible capacity of the negative electrode active material. However, since excessive $Li_2FeSiO_4$ or $LiFePO_4$ simply becomes a high resistance compound during ordinary operation of the lithium ion secondary battery; the amount of lithium in the second positive electrode active material layer is not considered preferable to be larger than an amount corresponding to an irreversible capacity of the negative electrode active material in the lithium ion secondary battery disclosed in Patent Literature 2.

Thus, in the lithium ion secondary battery of the present invention, the total amount of lithium in the thermal run-away suppressing layer is preferably less than an amount corresponding to an irreversible capacity of the negative electrode active material. Since the irreversible capacity of the negative electrode active material is a capacity calculated by subtracting an initial discharge capacity from an initial charge capacity of the lithium ion secondary battery, the irreversible capacity can be easily calculated by a person skilled in the art through simple experimentation.

Examples of the lithium transition metal silicate include compounds represented by $Li_2MSiO_4$ (M is one or more elements selected from transition elements). Specific examples of the lithium transition metal silicate include $Li_2FeSiO_4$, $Li_2MnSiO_4$, $Li_2NiSiO_4$, $Li_2CoSiO_4$, $Li_2Fe_{0.9}Co_{0.1}SiO_4$, $Li_2Fe_{0.75}Co_{0.25}SiO_4$, $Li_2Fe_{0.5}Co_{0.5}SiO_4$, and $Li_2Fe_{0.25}Co_{0.75}SiO_4$.

The thermal run-away suppressing layer contains, if necessary, the binding agent and/or the conductive additive. As the binding agent, those set forth in the description for the active material layer may be added to the thermal run-away suppressing layer singly or as a combination of two or more. Although the usage amount of the binding agent is not particularly limited, a range of 1 to 50 parts by mass of the binding agent with respect to 100 parts by mass of the lithium transition metal silicate is preferable. When the amount of the binding agent is too small, moldability of the thermal run-away suppressing layer deteriorates, whereas, when the amount of the binding agent is too large, the thermal run-away suppression effect of the thermal run-away suppressing layer becomes low. As the conductive additive, those set forth in the description for the active material layer may be added to the thermal run-away suppressing layer singly or as a combination of two or more. Although the usage amount of the conductive additive is not particularly limited, for example, 1 to 30 parts by mass of the conductive additive with respect to 100 parts by mass of the lithium transition metal silicate may be used.

Forming the thermal run-away suppressing layer on the positive electrode active material layer may be performed by using a conventional method known in the art such as roll coating method, dip coating method, doctor blade method, spray coating method, and curtain coating method. Specifically, an appropriate solvent is added to a mixture obtained by mixing the lithium transition metal silicate and, if necessary, the binding agent and/or the conductive additive, to obtain a thermal run-away suppressing layer forming composition in a paste form. The thermal run-away suppressing layer forming composition may also be obtained by adding, to the lithium transition metal silicate or the like, a solution obtained by dissolving the binding agent in a solvent in advance, or a suspension obtained by dispersing the binding agent in a solvent in advance. Examples of the solvent include N-methyl-2-pyrrolidone, methanol, ethanol, methyl isobutyl ketone, and water. The thermal run-away suppressing layer forming composition is applied on the surface of the positive electrode active material layer and dried thereafter. The drying may be performed under an ordinary pressure condition, or may be performed under a reduced pressure condition achieved by using a vacuum dryer. The drying temperature may be set as appropriate, and is preferably a temperature equal to or higher than the boiling point of the solvent. The drying time may be appropriately set depending on the applied amount and the drying temperature. In order to increase the density of the thermal run-away suppressing layer, a compression step may be performed on the dried positive electrode on which the thermal run-away suppressing layer is formed. Although the thickness of the thermal run-away suppressing layer is not particularly limited, the thickness is preferably within a range of 1 to 20 μm, more preferably within a range of 3 to 15 μm, and particularly preferably within a range of 4 to 10 μm.

The lithium ion secondary battery of the present invention has the negative electrode including the negative electrode active material.

As the material for the negative electrode active material, one or more types of a material known in the art to be used as the negative electrode active material of a lithium ion secondary battery, such as a carbon based material capable of occluding and releasing lithium, an element capable of forming an alloy with lithium, a compound including an element capable of forming an alloy with lithium, or a polymer material, may be used. Examples of the carbon based material include hardly graphitizable carbon, artificial graphite, natural graphite, cokes, graphites, glassy carbons, an organic-polymer compound baked product, carbon fiber, activated carbon, or carbon blacks. Here, the organic-polymer compound baked product refers to a carbonized product obtained by baking a polymer material such as phenols and furans at a suitable temperature. As the element capable of forming an alloy with lithium, specific examples thereof include Na, K, Rb, Cs, Fr, Be, Mg, Ca, Sr, Ba, Ra, Ti, Ag, Zn, Cd, Al, Ga, In, Si, Ge, Sn, Pb, Sb, and Bi; Si or Sn is particularly preferable. Specific examples of the compound including an element capable of forming an alloy with lithium include ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO, or LiSnO; and, among those described above, a compound including Si is preferable and $SiO_x$ ($0.5\leq x\leq1.5$) is particularly preferable. Examples of the compound including an element capable of reacting and forming an alloy with lithium include tin alloys (Cu—Sn alloy, Co—Sn alloy, etc.). Specific examples of the polymer material include polyacetylene and polypyrrole.

The negative electrode may include a current collector and a negative electrode active material layer that is formed on the current collector and that contains the negative electrode active material. As the current collector, the above described current collector may be appropriately used. The negative electrode active material layer contains, if necessary, the binding agent and/or the conductive additive. As the binding agent and/or the conductive additive in the negative electrode active material layer, those described above may be used in an amount described above. In order to form the negative electrode active material layer on the current collector, the methods described above may be used.

The amount of the positive electrode active material in the positive electrode and the amount of the negative electrode active material in the negative electrode may be appropriately determined so as to obtain a desired battery capacity in view of the lithium occlusion capability and lithium release capability of both of the active materials. The amount of both of the active materials is preferably determined with consideration being given to the fact that lithium of the lithium transition metal silicate contained in the thermal run-away suppressing layer is used at the first charging of the battery.

The lithium ion secondary battery of the present invention preferably has a separator that separates the positive electrode and the negative electrode to prevent short circuiting in the battery caused by a contact formed between both electrodes, while allowing ions to pass through. As the separator, a separator known in the art to be used in a lithium ion secondary battery may be used, and examples thereof include a porous film using one or more types of synthetic resins such as polytetrafluoroethylene, polypropylene, polyethylene, polyester, and polyamide. The separator may have a monolayer structure using a single synthetic resin, or a layered structure obtained by overlaying multiple synthetic resin layers. Although the thickness of the separator is not particularly limited, the thickness is preferably within a range of 5 μm to 100 μm, more preferably within a range of 10 μm to 50 μm, and particularly preferably within a range of 15 μm to 30 μm.

The lithium ion secondary battery of the present invention preferably has an electrolytic solution or a solid electrolyte which serves as a medium for transferring ions between the positive electrode and the negative electrode. The electrolytic solution is a liquid containing a solvent and an electrolyte dissolved in the solvent. As the electrolytic solution or the solid electrolyte, one that is known in the art to be used in a lithium ion secondary battery may be used.

Examples of the solvent used in the electrolytic solution include nonaqueous solvents such as cyclic esters, linear esters, ethers, and fluorine-containing cyclic esters. Examples of the cyclic esters include ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. Examples of the linear esters include dimethyl carbonate, diethyl carbonate, dibutyl carbonate, dipropyl carbonate, methylethyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. The fluorine-containing cyclic esters are obtained by partially substituting hydrogen atoms forming the above described cyclic esters with fluorine atoms; and examples thereof include fluoroethylene carbonate, 4,4-difluoro ethylene carbonate, 4,5-difluoro ethylene carbonate, and trifluoro propylene carbonate. As the solvent of the electrolytic solution, multiple types of those described above may be used in combination. In particular, a combination of four types consisting of fluoroethylene carbonate, ethylene carbonate, methylethyl carbonate, and dimethyl carbonate is preferably used.

Examples of the electrolyte of the lithium ion secondary battery include lithium salts such as $LiClO_4$, $LiAsF_6$, $LiPF_6$, $LiBF_4$, $LiCF_3SO_3$, and $LiN(CF_3SO_2)_2$. The concentration of the electrolyte in the electrolytic solution is preferably within a range of 0.5 to 1.7 mol/L.

One example of a method for producing the lithium ion secondary battery of the present invention is to be shown. First, the positive electrode including the current collector, the positive electrode active material layer, and the thermal run-away suppressing layer, and the negative electrode including the current collector and the negative electrode active material layer, are prepared using the above described methods. Next, the separator is interposed between the electrodes to form an electrode assembly. Then, connections are formed between the positive electrode current collector and a positive electrode external terminal and between the negative electrode current collector and a negative electrode external terminal, using current collection leads. Next, the electrolytic solution is added to the electrode assembly to obtain a lithium ion secondary battery. The form of the lithium ion secondary battery is not particularly limited, and various forms such as a cylinder type, a layered type, a coin type, and a laminated type may be used.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described more specifically by presenting Examples. The present invention is not limited to the following Examples.

Example 1

The lithium ion secondary battery of the present invention was produced in the following manner.

90 parts by mass of a lithium-containing metal oxide that has a layered rock salt structure and is represented by $LiNi_{5/10}Co_{2/10}Mn_{3/10}O_2$, which is a positive electrode active material, 5 parts by mass of acetylene black, which is a conductive additive, and 3 parts by mass of polyvinylidene fluoride, which is a binding agent, were mixed. The mixture was dispersed in a proper amount of N-methyl-2-pyrrolidone to create a slurry. As the positive electrode current collector, an aluminum foil having a thickness of 20 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone through volatilization, and an aluminum foil having the positive electrode active material layer formed thereon was obtained.

94 parts by mass of $Li_2FeSiO_4$, which is a lithium transition metal silicate, 3 parts by mass of acetylene black, which is a conductive additive, and 3 parts by mass of polyvinylidene fluoride, which is a binding agent, were mixed. The mixture was dispersed in a proper amount of N-methyl-2-pyrrolidone to obtain a thermal run-away suppressing layer forming composition.

On the positive electrode active material layer that is formed on the aluminum foil, the thermal run-away suppressing layer forming composition was applied in a film form by using a doctor blade. The aluminum foil was dried for 20 minutes at 80° C. to remove N-methyl-2-pyrrolidone through volatilization to obtain a positive electrode having the thermal run-away suppressing layer formed on the positive electrode active material layer. The ratio of the mass of $LiNi_{5/10}Co_{2/10}Mn_{3/10}O_2$ with respect to the mass of $Li_2FeSiO_4$ contained in the positive electrode was 9.

32 parts by mass of $SiO_x$ (0.5≤x≤1.5) and 50 parts by mass of natural graphite, which are negative electrode active materials, 8 parts by mass of acetylene black, which is a conductive additive, and 10 parts by mass of polyamide-imide, which is a binding agent, were mixed. The mixture was dispersed in a proper amount of N-methyl-2-pyrrolidone to create a slurry. As the negative electrode current collector, a copper foil having a thickness of 20 μm was prepared. The slurry was applied in a film form on the surface of the copper foil using a doctor blade. The copper foil on which the slurry was applied was dried to remove N-methyl-2-pyrrolidone, and then the copper foil was pressed to obtain a joined object. The obtained joined object was heated and dried in a vacuum dryer for 6 hours at 120° C. to obtain a copper foil having the negative electrode active material layer formed thereon. This was used as the negative electrode.

As the separator, a rectangular sheet (27×32 mm; thickness of 25 μm) formed of a resin film made from polypropylene was prepared.

An electrode assembly was formed by sandwiching the separator between the thermal run-away suppressing layer on the positive electrode and the negative electrode active material layer on the negative electrode. The electrode assembly was covered with a set of two sheets of a laminate film. The laminate film was formed into a bag-like shape by having three sides thereof sealed, and the electrolytic solution was poured therein. As the electrolytic solution, a solution obtained by dissolving $LiPF_6$ to be 1 mol/L in a solvent obtained by mixing 4 parts by volume of fluoroethylene carbonate, 26 parts by volume of ethylene carbonate, 30 parts by volume of methylethyl carbonate, and 40 parts by volume of dimethyl carbonate. Then, the remaining one side of the laminate film was sealed to seal four sides airtight to obtain a laminated type lithium ion secondary battery in which the electrode assembly and the electrolytic solution were sealed. This was used as a lithium ion secondary battery of Example 1. In the lithium ion secondary battery of Example 1, the amount of lithium in the thermal run-away suppressing layer is less than an amount corresponding to an irreversible capacity of the negative electrode active material.

The positive electrode and the negative electrode of the lithium ion secondary battery of Example 1 each include a tab enabling electrical connection to the outside, and one part of the tab extends outside the lithium ion secondary battery.

Example 2

A lithium ion secondary battery of Example 2 was obtained with a method similar to that of Example 1, except for setting the ratio of the mass of the $LiNi_{5/10}CO_{2/10}Mn_{3/10}O_2$ with respect to the mass of the $Li_2FeSiO_4$ included in the positive electrode to 4. The total mass of $LiNi_{5/10}CO_{2/10}Mn_{3/10}O_2$ and $Li_2FeSiO_4$ contained in the positive electrode of Example 2 is identical to that of Example 1. In the lithium ion secondary battery of Example 2, the amount of lithium in the thermal run-away suppressing layer is less than an amount corresponding to an irreversible capacity of the negative electrode active material.

Example 3

A lithium ion secondary battery of Example 3 was obtained with a method similar to that of Example 1, except for setting the ratio of the mass of the $LiNi_{5/10}CO_{2/10}Mn_{3/10}O_2$ with respect to the mass of the $Li_2FeSiO_4$ included in the positive electrode to 7/3. The total mass of $LiNi_{5/10}CO_{2/10}Mn_{3/10}O_2$ and $Li_2FeSiO_4$ contained in the positive electrode of Example 3 is identical to that of Example 1. In the lithium ion secondary battery of Example 3, the amount of lithium in the thermal run-away suppressing layer is less than an amount corresponding to an irreversible capacity of the negative electrode active material.

Example 4

A lithium ion secondary battery of Example 4 was obtained with a method similar to that of Example 1, except for setting the ratio of the mass of the LiNi$_{5/10}$Co$_{2/10}$Mn$_{3/10}$O$_2$ with respect to the mass of the Li$_2$FeSiO$_4$ included in the positive electrode to 1.5. The total mass of LiNi$_{5/10}$Co$_{2/10}$Mn$_{3/10}$O$_2$ and Li$_2$FeSiO$_4$ contained in the positive electrode of Example 4 is identical to that of Example 1. In the lithium ion secondary battery of Example 4, the amount of lithium in the thermal run-away suppressing layer is not less than an amount corresponding to an irreversible capacity of the negative electrode active material.

Comparative Example 1

A lithium ion secondary battery of Comparative Example 1 was obtained with a method similar to that of Example 1, except for setting the ratio of the mass of the LiNi$_{5/10}$Co$_{2/10}$Mn$_{3/10}$O$_2$ with respect to the mass of the Li$_2$FeSiO$_4$ included in the positive electrode to 1. The total mass of LiNi$_{5/10}$Co$_{2/10}$Mn$_{3/10}$O$_2$ and Li$_2$FeSiO$_4$ contained in the positive electrode of Comparative Example 1 is identical to that of Example 1.

Comparative Example 2

A lithium ion secondary battery of Comparative Example 2 was obtained with a method similar to that of Example 1, except for not forming a thermal run-away suppressing layer on the positive electrode. The mass of LiNi$_{5/10}$Co$_{2/10}$Mn$_{3/10}$O$_2$ contained in the positive electrode of Comparative Example 2 is identical to the total mass of LiNi$_{5/10}$Co$_{2/10}$Mn$_{3/10}$O$_2$ and Li$_2$FeSiO$_4$ in Example 1.

<Battery Evaluation>

By using the lithium ion secondary batteries of Examples 1 to 4 and Comparative Examples 1 to 2, discharge capacities of the lithium ion secondary batteries were measured by performing the following test. The results are shown in Table 1.

With respect to a lithium ion secondary battery that is to be measured, CCCV charging (constant-current constant-potential charging) was performed to a voltage of 4.5 V at 25° C. and 1 C rate, and then CC discharging (constant current discharging) was performed to 2.5 V at 0.33 C rate to conduct an initial adjustment. With respect to the lithium ion secondary battery on which the initial adjustment was conducted, CCCV charging was performed to a voltage of 4.5 V at 25° C. and 1 C rate, and then a discharge amount was measured when CC discharging was performed to 2.5 V at 0.33 C rate. A value obtained by dividing the discharge amount by the total mass of positive electrode active materials LiNi$_{5/10}$Co$_{2/10}$Mn$_{3/10}$O$_2$ and Li$_2$FeSiO$_4$ in the positive electrode was used as a discharge capacity.

TABLE 1

| | Mass ratio * | Discharge capacity (mAh/g) |
| --- | --- | --- |
| Example 1 | 9 | 142.2 |
| Example 2 | 4 | 144 |
| Example 3 | 7/3 | 145.8 |
| Example 4 | 1.5 | 141.3 |
| Comparative Example 1 | 1 | 137.5 |
| Comparative Example 2 | — | 140.4 |

* Mass ratio of LiNi$_{5/10}$Co$_{2/10}$Mn$_{3/10}$O$_2$ with respect to Li$_2$FeSiO$_4$ From the results of Examples 1 to 4 and Comparative Example 2, the discharge capacities of the lithium ion secondary batteries in which the ratio of the mass of the lithium-containing complex oxide in the active material layer with respect to the mass of the lithium transition metal silicate in the thermal run-away suppressing layer is not lower than 1.5 were shown to be superior when compared to the discharge capacity of the lithium ion secondary battery not having the thermal run-away suppressing layer. In particular, the discharge capacities were significantly superior in the lithium ion secondary batteries of Examples 1 to 3, in which the amount of lithium in the thermal run-away suppressing layer is less than an amount corresponding to an irreversible capacity of the negative electrode active material.

On the other hand, from the results of Comparative Examples 1 and 2, even with a lithium ion secondary battery having the thermal run-away suppressing layer, the discharge capacity of the lithium ion secondary battery is in some cases inferior to the discharge capacity of a lithium ion secondary battery not having the thermal run-away suppressing layer, depending on the ratio of the mass of the lithium-containing complex oxide with respect to the mass of the lithium transition metal silicate.

With respect to the lithium ion secondary battery of Example 3 and Comparative Example 2, the following nail penetration test was performed, and the behavior of the lithium ion secondary battery when internal short circuiting occurred was observed. The results are shown in Table 2.

A laminated type lithium ion secondary battery was layered such that the battery capacity became equivalent to 4 Ah. With respect to the layer-laminated type lithium ion secondary battery, constant-potential charging was performed until the potential stabilized at 4.1 V, 4.2V, or 4.3 V. The layer-laminated type lithium ion secondary battery that had been charged was disposed on a constraining plate having a hole with a diameter of 20 mm. The constraining plate was placed on a pressing machine having a nail attached to an upper portion thereof. The nail was moved at a rate of 20 mm/sec from up to down until the nail penetrated the layer-laminated type lithium ion secondary battery on the constraining plate and the tip portion of the nail reached inside the hole of the constraining plate. The behavior of the battery penetrated with the nail was observed at room temperature under atmospheric condition. The used nail was shaped to have a diameter of 8 mm and tip angle of 60°, and the material of the nail was S45C specified by JIS G 4051.

TABLE 2

| | Charging Voltage: 4.1 V | Charging Voltage: 4.2 V | Charging Voltage: 4.3 V |
| --- | --- | --- | --- |
| Example 3 | o | o | o |
| Comparative Example 2 | x | x | x |

In Table 2, "o" was written when smoke was not emitted from a battery, and "x" was written when smoke was emitted from a battery.

From the results in Table 2, by having the thermal run-away suppressing layer, thermal run-away and the accompanied emission of smoke were suppressed in a lithium ion secondary battery in which internal short circuiting occurred.

REFERENCE SIGNS LIST

1: positive electrode current collector
2: positive electrode active material layer
3: thermal run-away suppressing layer
4: separator 5: negative electrode active material layer
6: negative electrode current collector
7: lithium ion secondary battery

The invention claimed is:

1. A lithium ion secondary battery comprising:
a positive electrode including a current collector, a positive electrode active material layer that is formed on the current collector and that contains a positive electrode active material having a layered rock salt structure and being represented by a compositional formula: $Li_aNi_bCo_cMn_dD_eO_f$ ($0.2 \le a \le 1$; $b+c+d+e=1$; $1/3 \le b < 1$; $20/100 \le c < 1$; $0 \le e < 1$; D is at least one element selected from Li, Fe, Cr, Cu, Zn, Ca, Mg, S, Si, Na, K, and Al; $1.7 \le f \le 2.1$), and a thermal run-away suppressing layer that is formed on the positive electrode active material layer and that contains a lithium transition metal silicate and a binding agent in an amount of 1 to 50 parts by mass with respect to 100 parts by mass of the lithium transition metal silicate; and
a negative electrode including a negative electrode active material, wherein
a ratio of a mass of the lithium-containing complex oxide with respect to a mass of the lithium transition metal silicate in the positive electrode is not lower than 1.5.

2. The lithium ion secondary battery according to claim 1, wherein a total amount of lithium in the thermal run-away suppressing layer is less than an amount corresponding to an irreversible capacity of the negative electrode active material.

3. The lithium ion secondary battery according to claim 1, wherein the lithium transition metal silicate is represented by $Li_2MSiO_4$ (M is one or more elements selected from transition elements).

4. The lithium ion secondary battery according to claim 1, wherein the negative electrode active material includes Si.

5. The lithium ion secondary battery according to claim 1, wherein the thickness of the thermal run-away suppressing layer is within a range of 1 to 20 μm.

* * * * *